(12) United States Patent
Schroeder

(10) Patent No.: US 6,188,063 B1
(45) Date of Patent: Feb. 13, 2001

(54) RADIATION SENSING SYSTEM FOR DETECTING ELECTROMAGNETIC RADIATION AND TRANSMITTING A SENSORY SIGNAL THEREFROM

(75) Inventor: Alfred A. Schroeder, San Antonio, TX (US)

(73) Assignee: Lancer Partnership, Ltd., San Antonio, TX (US)

( * ) Notice: Under 35 U.S.C. 154(b), the term of this patent shall be extended for 0 days.

(21) Appl. No.: 09/277,892

(22) Filed: Mar. 29, 1999

(51) Int. Cl.[7] .................................. H01J 5/02; H01J 40/14
(52) U.S. Cl. ........................ 250/239; 250/214 R; 250/372
(58) Field of Search .......................... 250/239, 216, 250/229, 237 R, 226, 214 R, 372, 435; 356/51, 310

(56) References Cited

U.S. PATENT DOCUMENTS 4,535,247 * 8/1985 Kurtz ................................... 250/436
5,514,871   5/1996 Hayes et al. ........................ 250/372

* cited by examiner

*Primary Examiner*—John R. Lee
*Assistant Examiner*—Kevin Pyo
(74) *Attorney, Agent, or Firm*—Christopher L. Makay

(57) ABSTRACT

A radiation sensing system for detecting electromagnetic radiation and transmitting a sensory signal therefrom includes a body, a radiation sensor inserted substantially into an outlet portion of the body, a plug inserted substantially into an inlet portion of the body, a lens placed over the inlet of the plug, and a cap secured over the inlet portion of the body. A method for making the radiation sensing system includes forming the body from an inexpensive material, forming the radiation sensor and inserting it substantially into the outlet portion of the body, forming the plug from material resistant to radiation damage and inserting it substantially into the inlet portion of the body, placing the lens over the inlet of the plug, and forming a cap and placing it over the inlet portion of the body.

11 Claims, 2 Drawing Sheets

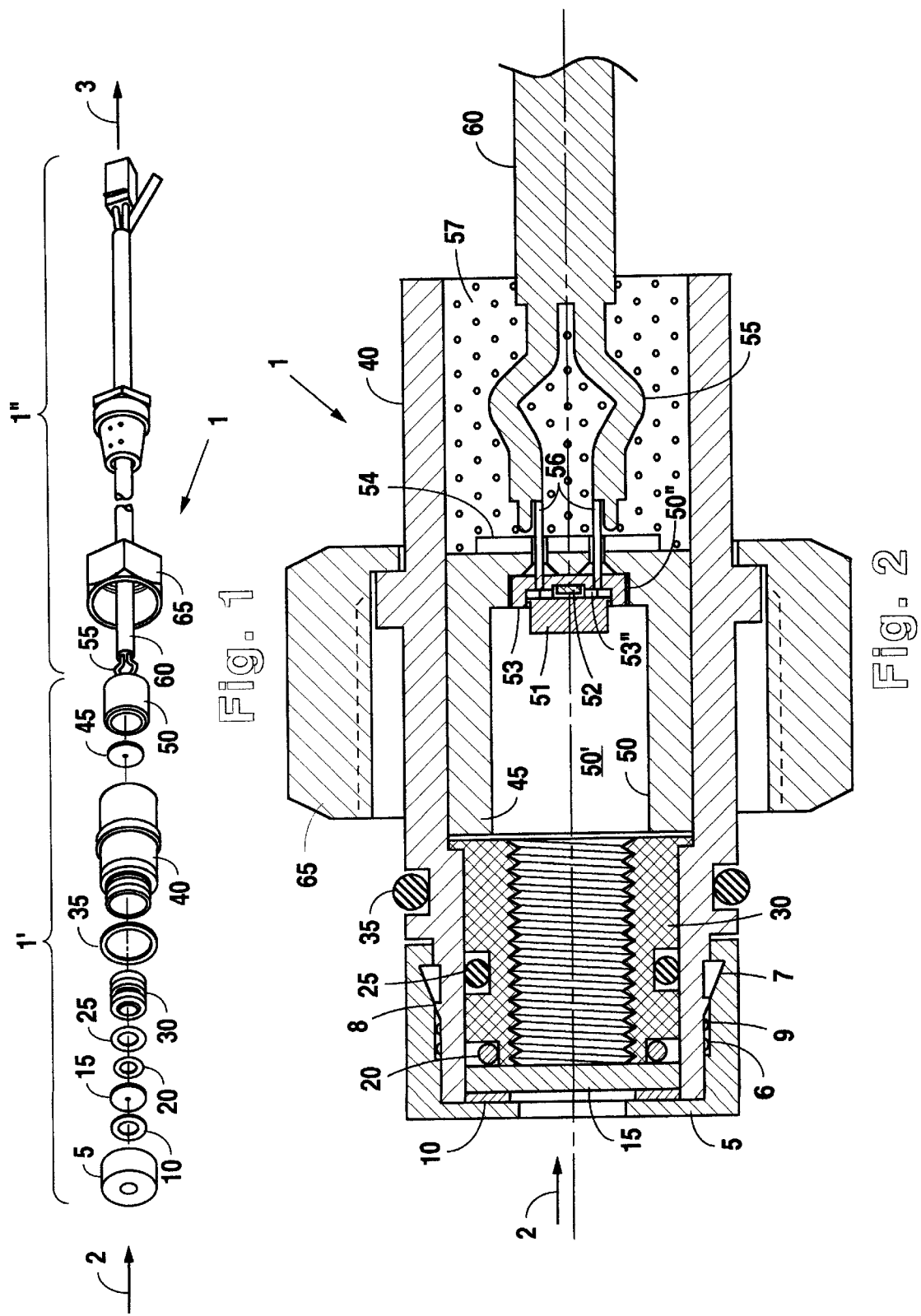

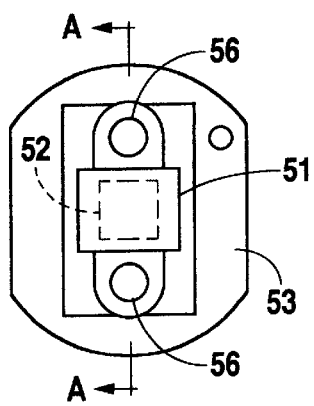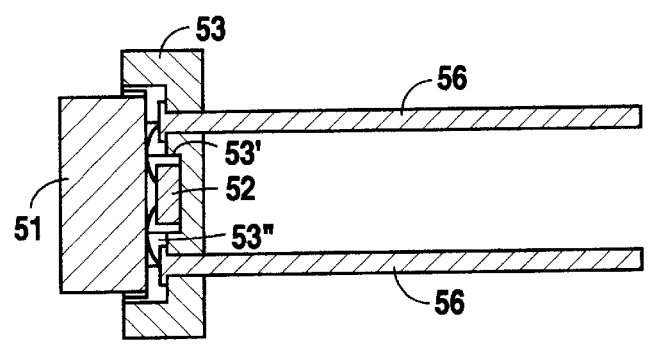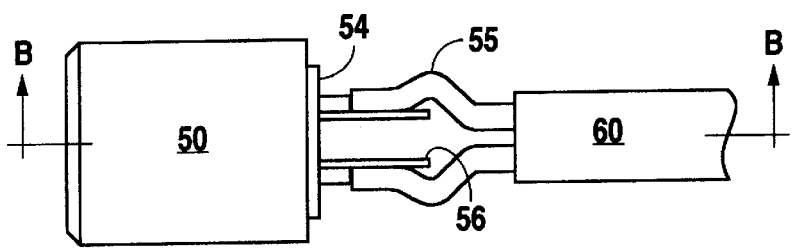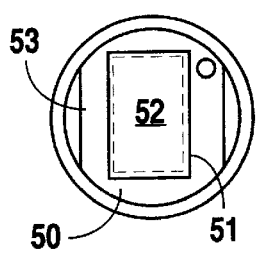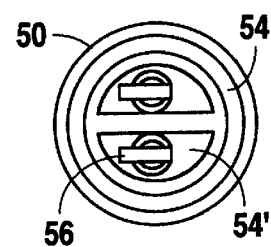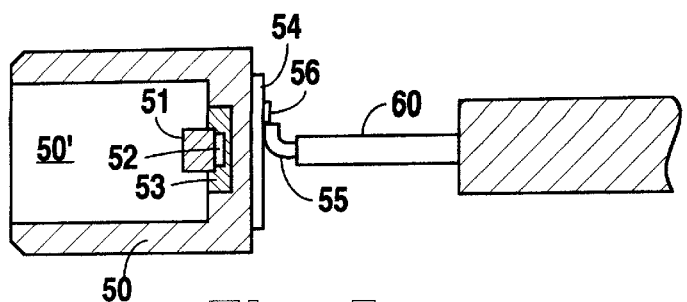

RADIATION SENSING SYSTEM FOR DETECTING ELECTROMAGNETIC RADIATION AND TRANSMITTING A SENSORY SIGNAL THEREFROM

BACKGROUND OF THE INVENTION

1. Field of the Invention

The present invention generally relates to a radiation sensing system and, more particularly, but not by way of limitation, to a radiation sensing system with improved resistance to damage from radiation consequential to prolonged operation.

2. Description of the Related Art

Radiation sensing systems are well known and are used when it is necessary to detect various bands of wavelength across the electromagnetic spectrum. As such, radiation sensing systems are employed to detect ultraviolet radiation associated with drinking water disinfecting units.

Generally, irradiating water with sufficient amounts of ultraviolet light will disinfect water for human consumption by eliminating microorganisms from the water. Commercially available drinking water disinfecting units typically employ ultraviolet light emitting lamps disposed within a passageway whereby water flowing through the passageway is disinfected by designated amounts of ultraviolet light emitted from the lamps.

Radiation sensing systems are often incorporated in drinking water disinfecting units to monitor the level of ultraviolet radiation emitted from the lamps, thereby enabling the overall efficiency of the water disinfection process to be assessed over a period of time. Unfortunately, however, subjecting radiation sensing systems to continuous and often highly increased radiation levels leads to progressive degradation and irreversible damage in that the radiation sensing system will no longer accurately detect ultraviolet light or may even completely fail.

Past attempts to mitigate potential damage from prolonged exposure to radiation have driven the overall cost of radiation sensing systems upward. As such, due to costs associated with repair or replacement, the use of current radiation sensing systems during the intended life span of a drinking water disinfecting unit is unreasonably expensive. For example, radiation sensing systems are unreasonably expensive in that such systems are often constructed entirely of stainless steel, which is well known to be relatively resistant to degradation from radiation. Moreover, radiation sensors within radiation sensing systems are independently and commercially available and are often expensive by design. In particular, well known "can" designs which house photodiodes are unreasonably costly. Costs associated with radiation sensors may also increase depending on the size, shape, and color of a photodiode filter.

Accordingly, there is a long felt need for a cost effective radiation sensing system with improved resistance to radiation damage.

SUMMARY OF THE INVENTION

In accordance with the present invention, a radiation sensing system for detecting electromagnetic radiation and transmitting a sensory signal therefrom includes a body formed from an inexpensive material. The body includes an outlet portion and an inlet portion. The radiation sensing system further includes a radiation sensor inserted substantially into the outlet portion of the body and a plug and inserted substantially into the inlet portion of the body. The plug is formed from material resistant to radiation damage and includes an inlet, an outlet, and a bore therethrough, whereby electromagnetic radiation travels through the plug via the bore. The radiation sensing system still further includes a lens placed over the inlet of the plug and a cap secured over the inlet portion of the body.

A method for making the radiation sensing system for detecting electromagnetic radiation and transmitting a sensory signal therefrom includes forming a body from an inexpensive material. As such, the body includes an outlet portion and an inlet portion. The method includes forming a radiation sensor, whereby the radiation sensor is inserted substantially into the outlet portion of the body.

A plug is formed from material resistant to radiation damage and then inserted substantially into the inlet portion of the body. The plug includes an inlet and a bore therethrough, whereby electromagnetic radiation travels through the plug via the bore. The preferred bore is threaded for attenuating the electromagnetic radiation traveling therethrough.

A lens is placed over the inlet of the plug. A cap is then formed and secured over the inlet portion of the body. In the preferred embodiment, the cap includes a top plate and a side wall extending outwardly from the top plate.

Specifically, the cap is secured over the inlet portion of the body by positioning a scraping notch against an aggregation of sealing material in a substantially sold phase to define a first position. The scraping notch is formed from the side wall of the cap and is engaged with the body. The aggregation of sealing material is then deformed.

As the cap is inserted further along the body from the first position to a second position, the scraping notch directs the deformed aggregation of sealing material from the first position across a ridge from the body to the second position whereby the aggregation of sealing material is allowed to collect in an annular cavity. The annular cavity is defined by the sidewall of the cap and the body, as the sidewall is placed over the body. Once a sufficient amount is collected in the annular cavity, material from the aggregation of sealing material is allowed to harden within the annular cavity. By abutting against the ridge and the cap, the hardened material wedges the cap to the body and, thus, firmly secures the cap to the body.

A radiation sensor is formed by fashioning a photodiode base. A photodiode is then coupled with the photodiode base and photodiode leads are coupled with the photodiode base as well. The photodiode and the photodiode leads are in cooperative engagement, whereby the photodiode detects electromagnetic radiation and emits a sensory signal from the radiation sensor via the photodiode leads.

In addition, a filter is formed for eliminating unwanted wavelength bands of electromagnetic radiation traveling therethrough. In the preferred embodiment, the filter is substantially square in shape. As such, the filter is coupled with the photodiode base substantially adjacent to and above the photodiode such that electromagnetic radiation travels through the filter to the photodiode.

It is therefore an object of the present invention to provide an apparatus and method of making a cost-effective radiation sensing system with improved resistance to radiation damage.

Still other objects, features, and advantages of the present invention will become evident to those skilled in the art in light of the following.

BRIEF DESCRIPTION OF THE DRAWINGS

FIG. 1 is an exploded view illustrating a radiation sensing system according to the preferred embodiment featuring a sensing assembly coupled with a signal cable assembly.

FIG. 2 is a side view in cross-section illustrating the preferred radiation sensing system.

FIG. 3 illustrates a radiation sensor for a radiation sensing system according to the preferred embodiment.

FIG. 3a is a top elevation view illustrating the radiation sensor.

FIG. 3b is a cross-section view taken along the lines a, a of FIG. 3a illustrating the radiation sensor.

FIG. 4 illustrates a radiation sensing unit from a sensing assembly according to the preferred embodiment coupled with a signal cable assembly.

FIG. 4a is a top view in cross-section taken along the lines b, b illustrating the radiation sensing unit.

FIG. 4b is side view illustrating the radiation sensing unit coupled with the signal cable assembly.

FIG. 4c is a bottom view in cross-section taken along the lines b, b illustrating the radiation sensing unit.

FIG. 5 is a side view in cross-section illustrating the radiation sensing unit from a sensing assembly according to the preferred embodiment coupled with the signal cable assembly.

DETAILED DESCRIPTION OF THE PREFERRED EMBODIMENT

As required, detailed embodiments of the present invention are disclosed herein, however, it is to be understood that the disclosed embodiments are merely exemplary of the invention, which may be embodied in various forms, the figures are not necessarily to scale, and some features may be exaggerated to show details of particular components or steps.

As illustrated in FIG. 1, a radiation sensing system 1 includes a sensing assembly 1' coupled with a signal cable assembly 1". As preferred, ultraviolet light emitting lamps from a drinking water disinfecting unit (not shown) emit light, in a direction shown as arrow 2, whereby the sensing assembly 1' detects such light. (See FIGS. 1–2). Accordingly, the sensing assembly 1' transmits a signal across the signal cable assembly 1", shown as directional arrow 3, to an electronic monitoring/control system (not shown) that assesses the overall efficiency of the water disinfection process.

In particular, as shown in FIGS. 1–5, the sensing assembly 1' includes a body 40. As preferred, the body 40 is generally cylindrical in shape having a central axis as well as an inlet portion and an outlet portion. To significantly reduce cost, the body 40 may be composed of any sufficient material such as plastic. The sensing assembly 1' includes a cap 5 having a top plate and a side wall whereby the side wall extends outwardly from the top plate. In this preferred embodiment, the cap 5 is composed of material resistant to radiation damage, such as stainless steel, which is well known for preventing damage from ultraviolet light. The top plate of the cap 5 defines at least one opening coaxial with the central axis of the body 40 to allow light to enter the interior of the body 40 at the inlet portion. Those skilled in the art will recognize that any sufficient number of openings through the top plate, which will facilitate the entry of light to the interior of the body 40, may be utilized.

The interior surface of the sidewall is adapted to fit around an exterior surface of the body 40 at the inlet portion. (See FIG. 2). In particular, as preferred, the interior surface of the sidewall of the cap 5 defines a scraping notch 6 that is engaged with the exterior surface of the body 40. Moreover, an annular cavity 7 is formed where the exterior surface of the body 40 meets with the interior surface of the sidewall of the cap 5. A ridge 8 extending from the exterior surface of the body 40 divides the scraping notch 6 from the annular cavity 7.

Accordingly, while in a first position, the cap 5 is placed over the body 40 so that the scraping notch 6 abuts an aggregation of sealing material 9 disposed on the exterior surface of the body 40. The aggregation of sealing material 9 is formed either by material defining the body 40 or by material placed on the exterior surface of the body 40. Furthermore, the aggregation of sealing material 9, as preferred, is composed of any readily deformable material, such as plastic or resin. Thus, while in the first position, the aggregation of sealing material 9 is in a substantially solid phase.

The aggregation of sealing material 9 is then allowed to deform, such as through the application of heat or ultrasonic means. As the cap 5 is inserted further along the body 40 from the first position to a second position, the scraping notch 6 directs the deformed aggregation of sealing material 9 from the first position across ridge 8 to the second position whereby the aggregation of sealing material 9 is allowed to collect in the annular cavity 7. Once a sufficient amount is collected in the annular cavity 7, the material from the aggregation of sealing material 9 is allowed to harden within the annular cavity 7. By abutting against the ridge 8 and the cap 5, the hardened material from the aggregation of sealing material 9 wedges the cap 5 to the body 40 and, thus, firmly secures the cap 5 with the body 40. In this preferred manner, there in no need for an O-ring seal between a cap and a body of a radiation sensing system for a drinking water disinfecting unit in that O-ring seals in the past often leak water into the body.

The sensing assembly 1' includes a lens 15 disposed within the inlet portion of the body 40 and axially aligned with the central axis. The lens 15 allows for electromagnetic radiation to exclusively pass into the interior of the sensing assembly 1' while potentially keeping water or any other foreign material from entering the interior of the sensing assembly 1'. The lens 15 may be composed of any electromagnetic radiation transmissive material, such as natural or synthetic quartz. A washer 10 is provided by the sensing assembly 1' between the lens 15 and the cap 5. The washer 10 defines an opening coaxial with the central axis for allowing electromagnetic radiation to travel between the cap 5 and the lens 15. In this preferred embodiment, the washer 10 is composed of material that provides little friction against surfaces applied thereon, such as TEFLON.

The sensing assembly 1' includes a plug 30 with an inlet and an outlet. At its inlet, the plug 30 is disposed within the inlet portion of the body 40 adjacent the lens 15. In this preferred embodiment, the plug 30 is adapted to frictionally fit against an interior surface of the body 40 although those skilled in the art will recognize other suitable means for securing the plug 30 within the body 40. In this preferred embodiment, the plug 30 is threadedly bored therethrough such that a resulting threaded bore is coaxial with the central axis. The threaded bore, in part, attenuates the electromagnetic radiation traveling through the plug 30 as required by the radiation sensing system 1. It is essential that the plug 30 be composed of a material resistant to radiation damage, such as stainless steel.

As such, a plug significantly reduces manufacturing costs for a radiation sensing system in that it is not necessary to construct a body and other component parts of a radiation sensing system from material resistant to radiation damage, which is relatively more costly. Ultimately, to optimally reduce cost, only those components, such as a plug, exposed to electromagnetic radiation as it travels through a sensing assembly should be composed from material resistant to radiation damage.

The sensing assembly 1' includes an aperture disk 45 axially aligned with the central axis and disposed within the inlet portion of the body 40 adjacent the outlet of the plug 30. The aperture disk 45 defines at least one aperture coaxial with the central axis, whereby electromagnetic radiation travels from the plug 30 therethrough. In this preferred embodiment, the aperture disk 45 is composed of material resistant to radiation damage, such as stainless steel.

The sensing assembly 1' further includes a radiation sensing unit disposed within the body 40 adjacent the aperture disk 45 such that the aperture disk 45 is between the plug 30 and the radiation sensing unit. Moreover, the radiation sensing unit is axially aligned with the central axis of body 40. The radiation sensing unit, in turn, includes a radiation sensor whereby electromagnetic radiation travels through the cap 5, the washer 10, the lens 15, the plug 30, and the aperture disk 45 to the radiation sensor. In this preferred embodiment, the radiation sensor detects ultraviolet radiation and emits a signal across the signal cable assembly 11" to the electronic monitoring/control system thereby enabling the signal to be assessed for the overall efficiency of the water disinfection process.

As shown in FIGS. 2–5, the radiation sensing unit includes a spacer 50 with an external spacer portion and an internal spacer portion. The spacer 50 is disposed within the body 40 adjacent the aperture disk 45 such that the external spacer portion is adapted, in part, to frictionally fit against an interior surface of the body 40, although those skilled in the art will recognize other suitable means for securing the spacer 50 within the body 40. The internal spacer portion includes an open end and a closed end and defines a collecting chamber 50' therebetween. Thus, electromagnetic radiation is received through the open end from the aperture disk 45, collected within the collecting chamber 50', and projected on the closed end. The radiation sensor is disposed on the closed end, coaxial with the central axis of the body 40, to receive electromagnetic radiation from the collecting chamber 50'. It should be emphasized that the size and shape of the collecting chamber 50' is configured to optimally project electromagnetic radiation onto the radiation sensor.

The radiation sensor includes a photodiode base 53. (See FIG. 3). In this preferred embodiment, the closed end of the internal portion of the spacer 50 defines a recess 50" in which the photodiode base 53 is inserted and secured to, using any suitable means. (See FIG. 2). The size and shape of the photodiode base 53 may be configured to optimally receive electromagnetic radiation from the spacer 50. The radiation sensor includes a photodiode 52 secured to the photodiode base 53 and coaxial with the central axis. The radiation sensor further includes photodiode leads 56 secured to the photodiode base 53 and axially aligned with the central axis. (See FIG. 3). Specifically, in this preferred embodiment, the photodiode 52 detects ultraviolet radiation and the photodiode leads 56 transmit a signal from the photodiode 52 across the signal cable assembly 1" to the electronic monitoring/control system.

In this preferred embodiment, the photodiode base 53 defines a recess 53' into which the photodiode 52 is inserted and secured. Additionally, as preferred, the photodiode base 53 may include positioning mounts 53" integral with the photodiode base 53. The radiation sensor includes a filter 51 coaxial with the central axis and secured to the photodiode base 53 via positioning mounts 53" so that the filter 51 is substantially adjacent to and above the photodiode 52. In operation, electromagnetic radiation passes from the collecting chamber 50', across the filter 51 to the photodiode 52. Accordingly, integrating the photodiode 52 with the photodiode base 53 significantly reduces manufacturing costs for a radiation sensor in that it is not necessary to purchase an elaborate, commercially available photodiode sensor unit, such as the well known "can" design, which is relatively more costly.

The filter 51 eliminates unwanted wavelengths from the incoming electromagnetic radiation so that the photodiode 52 receives only a desired band, such as ultraviolet light, thereby mitigating or eliminating the effects of radiation damage on the radiation sensor. In this preferred embodiment, the filter 51 is composed of any electromagnetic radiation transmissive material sensitive to a particularly desired wavelength band, such as natural or synthetic quartz. In this preferred embodiment, the filter 51 is square shaped which significantly reduces manufacturing costs for a radiation sensor in that it is not necessary to construct a filter with a more elaborate shape, such as a round or an oval shape for example, as in the past which was relatively more costly.

Moreover, the radiation sensing unit includes an assembly base 54 axially aligned with the central axis and disposed within the outlet portion of the body 40. (See FIGS. 2, 4–5). Additionally, in this preferred embodiment, the assembly base 54 is substantially adjacent to the external portion of the spacer 50 near the closed end. The assembly base 54 defines openings for receiving the photodiode leads 56 therethrough. As such, in this preferred embodiment, the photodiode leads 56 extend from the photodiode base 53, through the spacer 50, across the assembly base 54, and couple with the signal cable assembly 1" via a cable harness 55. (See FIG. 2). The assembly base 54 may include a conductive laminate 54' disposed on the assembly base 54 for enhancing the quality of the signal transmitted between the photodiode leads 56 and the signal cable assembly 1". (See FIG. 4c). In particular, the conductive laminate 54' may be positioned at the openings of the assembly base 54 and substantially adjacent to the photodiode leads 56 that pass through the openings.

The signal cable assembly 1" for the radiation sensing system 1 includes the cable harness 55 in cooperative engagement with the photodiode leads 56 and includes a cable 60 linked with the cable harness 55 for transmitting a signal from the cable harness to the electronic monitoring/control system. In particular, the cable harness 55 is set in cooperative engagement with the photodiode leads 56 to receive a signal therefrom. Although the preferred signal cable assembly includes a cable and a cable harness, those skilled in the art will recognize other equivalent means for transmitting a signal from the sensing apparatus, such as an antenna. The signal cable assembly 1" is coupled with the sensing assembly 1' in the following preferred manner. The cable harness 55 and the cable 60 are positioned within the outlet portion of the body 40 so that they are each coaxial with the central axis. (See FIG. 2). The cable harness 55 and the cable 60 retain their relative positions within the outlet portion in that a filler substrate 57 is introduced into the outlet portion. Besides allowing the signal cable assembly to maintain a desired position within the outlet portion, the filler substrate 57 in this preferred embodiment sufficiently secures the signal cable assembly 1" within the outlet portion.

Furthermore, as shown in FIGS. 1 and 2, the radiation sensing system 1 may include O-rings 20, 25, and 35 as well as a securing nut 65. In particular, the O-ring 20 may be provided between the lens 15 and the plug 30 to create a seal that firmly secures the lens 15 against the washer 5 while potentially keeping water or any other foreign material from entering the interior of the sensing assembly 1'. The O-ring 25 may be provided between the plug 30 and the body 40 to enhance the frictional fit of the plug 30 against the interior surface of the body 40. The O-ring 35 and the securing nut 65 may each be provided to facilitate the integration of a radiation sensing system with an element to be monitored, such as a drinking water disinfecting unit.

During operation of the preferred radiation sensing system 1, ultraviolet light emitting lamps from a drinking water disinfecting unit emit light according to arrow 2. (See FIG. 2). Ultraviolet light travels across the sensing assembly 1' and is detected by the radiation sensor incorporated within the sensing assembly 1'. According to directional arrow 3, the radiation sensor thus transmits a signal across the signal cable assembly 1", coupled with the sensing assembly 1', to an electronic monitoring/control system that assesses the overall efficiency of the water disinfection process. Specifically, ultraviolet light passes through the sensing assembly 1' via an opening provided by the cap 5, an opening provided by the washer 10, the lens 15, a threaded bore of the plug 30, an aperture provided by the aperture disk 45 to the radiation sensing unit. Within the radiation sensing unit, ultraviolet light travels across the collecting chamber 50' that is configured to optimally project the light onto a radiation sensor of the radiation sensing unit. As such, light within the radiation sensor travels through the filter 51 to the photodiode 52 that detects ultraviolet radiation and transmits a corresponding signal from the photodiode 52 across the photodiode leads 56 to the cable harness 55. It should also be added that the photodiode leads 56 extend through the radiation sensing unit, from the photodiode base 53, through the spacer 50, and across the assembly base 54, and couple with the signal cable assembly 1" via the cable harness 55. The signal thus continues its path across the signal cable assembly 1", from the cable harness 55 across the cable 60 linked with the cable harness 55, to the electronic monitoring/control system.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

I claim:

1. A method of making a radiation sensing system for detecting electromagnetic radiation and transmitting a sensory signal therefrom, comprising the steps of:

forming a body from an inexpensive material, the body including an outlet portion and an inlet portion;

forming a radiation sensor;

inserting the radiation sensor substantially into the outlet portion of the body;

forming a plug from material resistant to radiation damage, the plug including an inlet, an outlet, and a bore therethrough, whereby electromagnetic radiation travels through the plug via the bore;

inserting the plug substantially into the inlet portion of the body;

placing a lens over the inlet of the plug;

forming a cap including a top plate and a side wall extending outwardly from the top plate; and securing the cap over the inlet portion of the body, comprising the steps of:

forming a scraping notch in the side wall, the scraping notch engaged with the body;

forming an annular cavity defined by the sidewall of the cap and the body as the sidewall is placed over the body;

positioning the scraping notch against an aggregation of sealing material in a substantially solid phase to define a first position;

deforming the aggregation of sealing material;

inserting the cap further along the body from the first position to a second position;

directing the deformed aggregation of sealing material with the scraping notch from the first position across a ridge from the body to a second position, whereby the aggregation of sealing material collects in the annular cavity; and resolidifying the aggregation of sealing material within the annular cavity thereby wedging the cap to the body.

2. The method according to claim 1, wherein the step of forming a radiation sensor, comprises the steps of:

forming a photodiode base;

coupling a photodiode with the photodiode base; and coupling photodiode leads with the photodiode base, the photodiode and the photodiode leads in cooperative engagement whereby the photodiode detects electromagnetic radiation and emits a sensory signal from the radiation sensor.

3. The method according to claim 2, wherein the step of forming a radiation sensor further comprises the steps of:

forming a filter for eliminating unwanted wavelength bands of electromagnetic radiation traveling therethrough; and coupling the filter with the photodiode base substantially adjacent to and above the photodiode such that electromagnetic radiation travels through the filter to the photodiode.

4. The method according to claim 3, wherein the step of forming a filter further comprises the step of forming a filter of a substantially square shape.

5. The method according to claim 1, wherein the step of forming a plug further comprises the step of threading the bore for attenuating electromagnetic radiation traveling therethrough.

6. A method of securing a cap to a radiation sensing system, comprising the steps of:

providing a cap including a top plate and a side wall extending outwardly from the top plate;

providing a radiation sensing system, the radiation sensing system comprising a body;

forming a scraping notch from the side wall, the scraping notch engaged with the body;

forming an annular cavity defined by the sidewall of the cap and the body as the sidewall is placed over the body;

positioning the scraping notch against an aggregation of sealing material in a substantially solid phase to define a first position;

deforming the aggregation of sealing material;

inserting the cap further along the body from the first position to a second position;

directing the deformed aggregation of sealing material with the scraping notch from the first position across a ridge from the body to a second position, whereby the aggregation of sealing material collects in the annular cavity;

resolidifying the aggregation of sealing material within the annular cavity, thereby wedging the cap to the body.

7. A radiation sensing system for detecting electromagnetic radiation and transmitting a sensory signal therefrom, comprising:

a body formed from an inexpensive material, the body including an outlet portion and an inlet portion;

a radiation sensor inserted substantially into the outlet portion of the body;

a plug formed from material resistant to radiation damage and inserted substantially into the inlet portion of the body, the plug including an inlet, an outlet, and a bore therethrough, whereby electromagnetic radiation travels through the plug via the bore;

a lens placed over the inlet of the plug; and a cap secured over the inlet portion of the body, wherein the cap comprises:
a top plate,
a sidewall extending outwardly from the top plate, and
a scraping notch formed in the sidewall.

8. The radiation sensing system according to claim 7, wherein the radiation sensor, comprises:

a photodiode base;

a photodiode coupled with the photodiode base; and photodiode leads coupled with the photodiode base, the photodiode and the photodiode leads in cooperative engagement, whereby the photodiode detects electromagnetic radiation and emits a sensory signal from the radiation sensor.

9. The radiation sensing system according to claim 8, wherein the radiation sensor further comprises a filter for eliminating unwanted wavelength bands of electromagnetic radiation traveling therethrough, wherein the filter is coupled with the photodiode base substantially adjacent to and above the photodiode such that electromagnetic radiation travels through the filter to the photodiode.

10. The radiation sensing system according to claim 9, wherein the filter comprises a substantially square shape.

11. The radiation sensing system according to claim 7, wherein the plug comprises a threaded bore for attenuating electromagnetic radiation traveling therethrough.

* * * * *